United States Patent [19]
Lacrosse

[11] Patent Number: 5,615,122
[45] Date of Patent: Mar. 25, 1997

[54] METHOD AND APPARATUS TO CONSTRUCT BUILDING COMPONENTS

[76] Inventor: Frank Lacrosse, 204 Knollwood, Quincy, Ill. 62301

[21] Appl. No.: 372,322

[22] Filed: Jan. 13, 1995

[51] Int. Cl.$^6$ ............ G06F 19/00; B21D 39/03; B27F 7/00
[52] U.S. Cl. .............. 364/468.01; 364/468.24; 364/474.09; 29/430; 227/40; 227/100
[58] Field of Search .............. 364/474.09, 468, 364/468.01, 468.02, 468.03, 468.04, 468.21, 468.24; 29/430, 33 K, 56.6, 432, 703, 795, 798, 822, 823; 227/39, 99, 40, 102, 43, 103, 152, 100; 156/538, 539, 560, 556

[56] References Cited

U.S. PATENT DOCUMENTS

| | | | |
|---|---|---|---|
| 3,848,791 | 11/1974 | Jureit et al. | 227/100 |
| 4,039,112 | 8/1977 | Schultz | 227/40 |
| 4,133,097 | 1/1979 | Slade | 29/33 P |
| 4,154,436 | 5/1979 | Sellers | 269/321 F |
| 4,305,538 | 12/1981 | Schultz . | |
| 4,459,735 | 7/1984 | Sawdon . | |
| 4,876,787 | 10/1989 | Ditty et al. | 29/430 |
| 5,046,015 | 9/1991 | Dasher et al. | 364/474.09 |
| 5,414,918 | 5/1995 | Pearson | 29/33 K |

FOREIGN PATENT DOCUMENTS

| | | |
|---|---|---|
| 1579193 | 8/1969 | France . |
| 2005181 | 4/1979 | United Kingdom . |
| 8402677 | 7/1984 | WIPO . |
| 9411597 | 5/1994 | WIPO . |

Primary Examiner—Tan V. Mai
Assistant Examiner—Thomas E. Brown
Attorney, Agent, or Firm—Griffin, Butler, Whisenhunt & Kurtossy

[57] ABSTRACT

A table is provided to assist in the manufacture of building structures such as walls or the like where the building structure has a plurality of metallic studs extending between top and bottom metallic channel shaped framing members. The table includes a grasping device to move the building structure back and forth along a support surface of the table. A computer operated controller controls a motor to locate the top and bottom framing members adjacent assembly stations. The assembly stations permanently attach a stud to each of the top and bottom framing members.

33 Claims, 10 Drawing Sheets

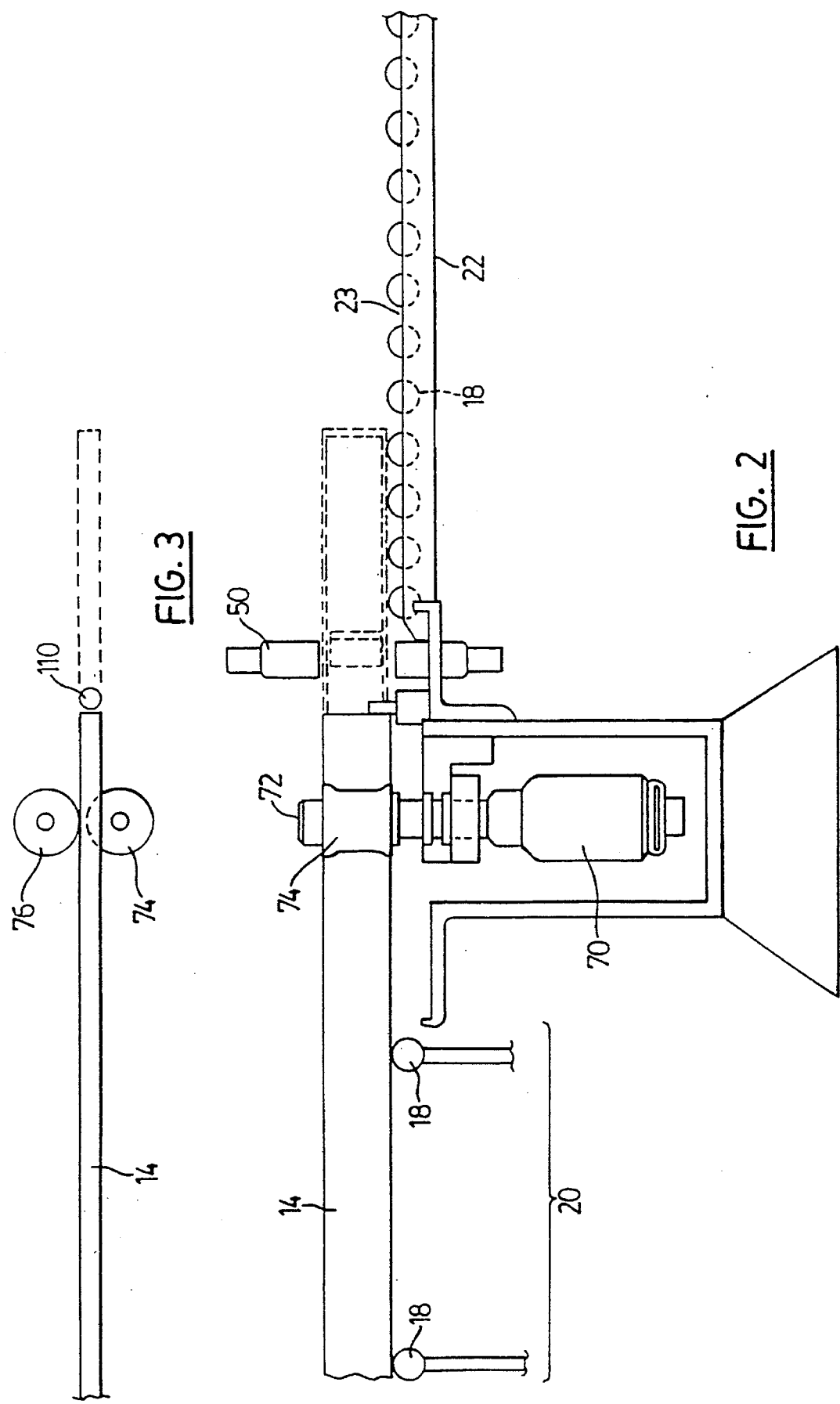

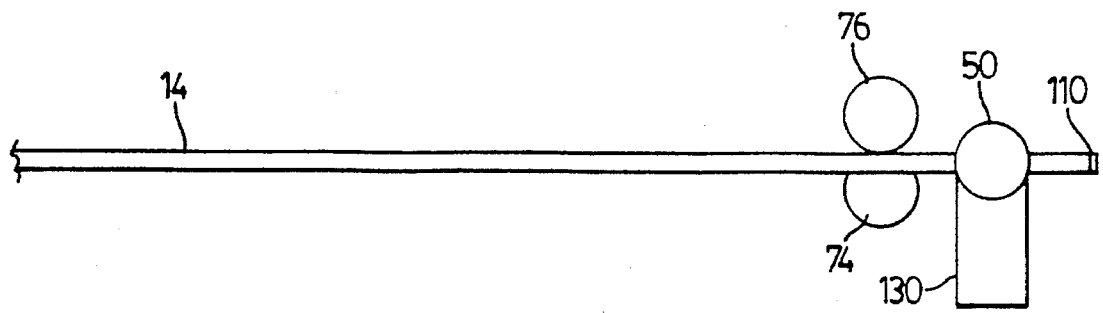
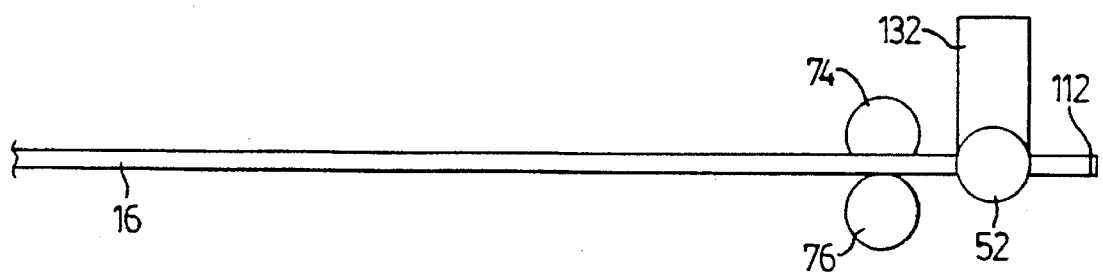
FIG. 6
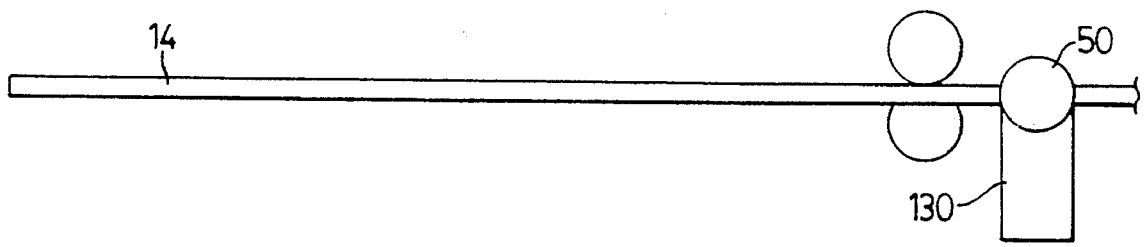
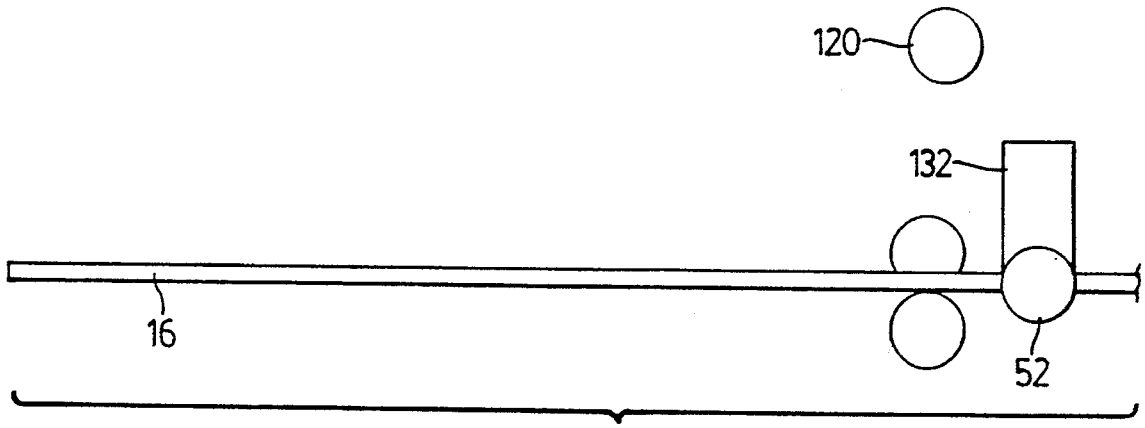
FIG. 7

METHOD AND APPARATUS TO CONSTRUCT BUILDING COMPONENTS

FIELD OF THE INVENTION

This invention relates to the field of devices to assist in the construction of building components, more particularly walls and the like. The device has application in the construction of components for use in residential, commercial and industrial buildings.

Typically, walls have been framed using the so-called stick framing method. In the stick frame method walls are manufactured from studs and bottom and top framing members called plates. The studs are typically made from lumber and are usually made out of nominal two inch thickness lumber. Typically, the studs and plates may be made from lumber referred to as a two-by-four. A two-by-four is a piece of lumber of desired length having nominal dimensions of two inch thickness by four inch width. Stick framing typically involves the technique of nailing the studs to the top and bottom plates. The convention has developed that the studs are placed along the plate spaced 16" on centres.

The wall manufactured from two-by-four building materials is relatively strong. That wall will normally support most of the structural loads which may be imposed in residential construction and often will be strong enough to support the loads required in industrial and commercial buildings as well. However, where the studs are used on outside walls and where a need for extra insulation occurs, then the width of the studs may be increased to nominal 6" boards, or in extreme cases, to nominal 8" boards. The extra width provides the necessary space to increase the insulation that is packed into the walls between the studs.

When the walls are used in the internal walls of the building and have no need for insulation then width of the material may be varied depending upon whether the wall is a structural wall, that is to say, supporting a load, or whether the wall is merely a divider wall to divide up the enclosed spaces. For ease of construction, typically most interior walls have also been manufactured from two-by-four nominally dimensioned lumber.

Construction lumber is becoming more and more scarce and accordingly is becoming more and more expensive. Additionally, working with lumber involves certain difficulties. Unless the lumber is properly dried then the two-by studs will warp or twist over time as the studs dry in the building. This can often cause changes to the wall which in turn will lead to cracking of the materials used to cover the wall which typically may be wall board and the like. As construction lumber has become more and more expensive, alternatives have been developed to the use of wooden structural members.

One of the alternatives that has developed is the use of steel studs. Steel studs can be made in roll forming machines from strips of steel of convenient gauge or thickness. The roll forming machine can roll the strip steel into a stud of any configuration. When steel studs are used, typically they are used together with upper and lower tracks into which the steel studs are intended to be placed.

Steel studs have several advantages over wooden studs. Steel studs are lighter than wooden studs for equal strength. Steel studs, of course, have no tendency to warp and thus a wall when manufactured from steel studs will not be subject to warping as the material dries and thus provides a more secure surface against which the wall surfacing materials may be affixed. Although steel studs are now well-known, there have been certain difficulties in working with steel studs.

One of the difficulties is the positioning of the stud in the upper and lower track. Another is the proper fixation of the stud into the track. Because of the convention which has become accepted for spacing for wooden studs, steel studs are similarly placed 16" on centres. This is not so much a strength requirement as it is a convention requirement so that the steel studs can be used without difficulty with common building materials such as wall board which typically comes in sheet form of four foot width. The four foot width allows the sheet to be affixed to the studs at either edge and at two strips equally spaced from the edges. Where however the facing material is sufficiently strong, the studs may be placed further apart such as 24" on centres which still facilities use with four foot wide sheet facing materials while providing adequate strength. Generally stud spacing such as 16" or 24" on centres is dictated by applicable building codes.

Because steel studs are manufactured in a roll forming machine the steel studs can be made to any configuration or any dimension as desired by the building designer. Accordingly, if steel studs are to be used in an exterior wall where significant levels of insulation are required, then the studs may be manufactured of sufficient width to approximate the same dimension as a two-by-six wooden stud or even a two-by-eight wooden stud where super insulation is required.

With the known construction using two-by-four studs the process for manufacturing a wall from such building materials requires the use of skilled framing carpenters. The framing carpenters have the job of cutting the studs to the correct length. The correct length is determined by the height of the wall which typically may be of the order of 8 feet but may also be higher particularly in commercial and industrial buildings. When a number of studs have been cut to length, the carpenter must then lay out the location of where the studs will be attached to the upper and lower plates. The lay out of the studs involves the considerations of the strength of the wall as well as the other features of the wall. Where there are no other features of the wall the studs will be placed according to convention spaced 16" on centres. Where, however, the wall contains doors, windows, other openings or requires structure to facilitate the joining of intersections of meeting walls then studs must be placed where required. Typically when a window is framed a basic 16" on centre spacing will be maintained but various shorter studs some times referred to as cripple studs or other studs some times referred to as jack studs must be placed to ensure that the location of the window or door does not effect the overall strength of the wall. Even where the wall is an interior non-load bearing wall the studs must still be placed to ensure integrity of the wall when accommodating interior doors, intersecting walls and the like. All of this requires that the framing carpenter be capable of reading the architectural or structural plans for the wall and then laying out the stud spacing on the top and bottom plates. The framing carpenter then nails the studs to the plates and must ensure that the wall so manufactured is square and of the correct height and length.

The time to prepare and install the structural framing in a house whether residential, commercial or industrial is a significant portion of the building time and is a significant cost factor in terms of both time and materials.

With the use of steel studs the same basic requirements must be met. The upper and lower tracks or channels must be laid out and the framer must now have reference to the plans and lay out the location of the studs on the top and bottom channels. When steel studs are fixed in their location in channels, most often screws are used. The screws will pass through the flange of the stud and the flange of the track. Typically the channels are laid out on a floor and studs positioned as required. As each stud is correctly positioned, a screw is driven through the channel and through one flange of the stud. A second screw in each stud cannot be installed as the wall is on the floor. When all studs are fastened with one screw, the wall can be flipped over and the second screw installed to complete each stud-channel connection. Often, in practice, the second screws are not applied if applied at all, until the wall has been positioned upright in place. This then requires the framer to climb up and down ladders to complete both top and bottom connections.

Another of the problems that has occurred in the use of metal studs and metal tracks is the problem of fully seating the stud in the track. If the track is not properly shaped then the stud may not be fully seated in the track. This is something that may not be immediately apparent to the framer. When the framer attaches a stud in place that is not fully seated in the track, the framer may not be aware of the fact that the misseating error has occurred. This unfortunately means that when a load is applied to the wall then the screw or screws fixing the stud location become structural members and in fact support the load carried on the stud. Where a metal frame wall is intended to be load bearing, the intention is that the load be communicated directly from the upper track to the stud and then to the lower track. If the stud is not properly seated in for example the upper track, then the load passes from the upper track to the screw, from the screw to the stud and creates a point of possible failure. Because of this problem, steel studs have most commonly been used in non-load bearing walls even though steel studs are stronger than wooden studs.

Typically today framing of wooden studs and headers can be done by means of a pneumatic driven nail gun. This has speeded up the nailing component of the time involved. Similarly, the installation of screws in steel studs is most often done by a powered screw gun which may be either air or electrically driven. There is however still considerable time involved in the layout and installation of the fasteners which locate the studs in the track.

SUMMARY OF THE INVENTION

In accordance with the present invention there is provided a table which facilitates the creation of building structures such as walls consisting of studs and extending between first and second framing members or channels. The table comprises a support surface for movably supporting the first and second framing members to permit the members to be moved back and forth along the support surface. Locating means are provided on the table to locate the upper and lower framing members and to define a start position. The table comprises grasping means to grip the building structure to move the building structure back and forth along the table as required and motor means to move the building structure. The table also includes controller means to control the motor means to translate the building structure predetermined distances along the support structure. The table further comprises locating means to locate a stud between the framing members and at least first and second assembly stations. The assembly stations are adapted to affix a stud to the first and second framing members respectively. The control means is adapted to receive information determining the location of the studs in the building structure with respect to the first and second framing members.

In accordance with the present invention a method of forming a building structure having first and second framing members and a plurality of studs extending between the framing member comprises the steps of locating a first framing member on a support surface, locating a second framing member on the support surface with the second framing member spaced from the first framing member and arranged parallel thereto, grasping the building structure and locating the building structure in a first position, assembling a stud to extend between the first and second framing members and locating the stud adjacent first and second assembly means, moving the first and second framing members to desired positions, connecting the stud to the framing members, advancing the building structure along the support surface, assembling a second stud to extend between the first and second framing members and locating the second stud adjacent the first and second assembly means, controlling the position of the building structure and locating the building structure with respect to the second stud in a predetermined location and then connecting said second stud to said building structure.

BRIEF DESCRIPTION OF THE DRAWINGS

The invention will be further understood by reference to the attached figures which illustrate a preferred embodiment of the invention and in which, FIG. 1.is a perspective view of a table in accordance with the invention;

FIG. 2 is a side view of a portion of the device of FIG. 1 illustrating a frame member supported on a support surface;

FIG. 3 is a plan view of the structure of FIG. 2, but showing only the frame member and the mechanism to grasp the frame member;

FIG. 6 is a plan view showing the location of two framing members on the support surface of the device of FIG. 1 which show the initial start position for the process;

FIG. 7 is a view similar to FIG. 6 but showing another step in the process;

DESCRIPTION OF PREFERRED EMBODIMENTS

Figure 1:
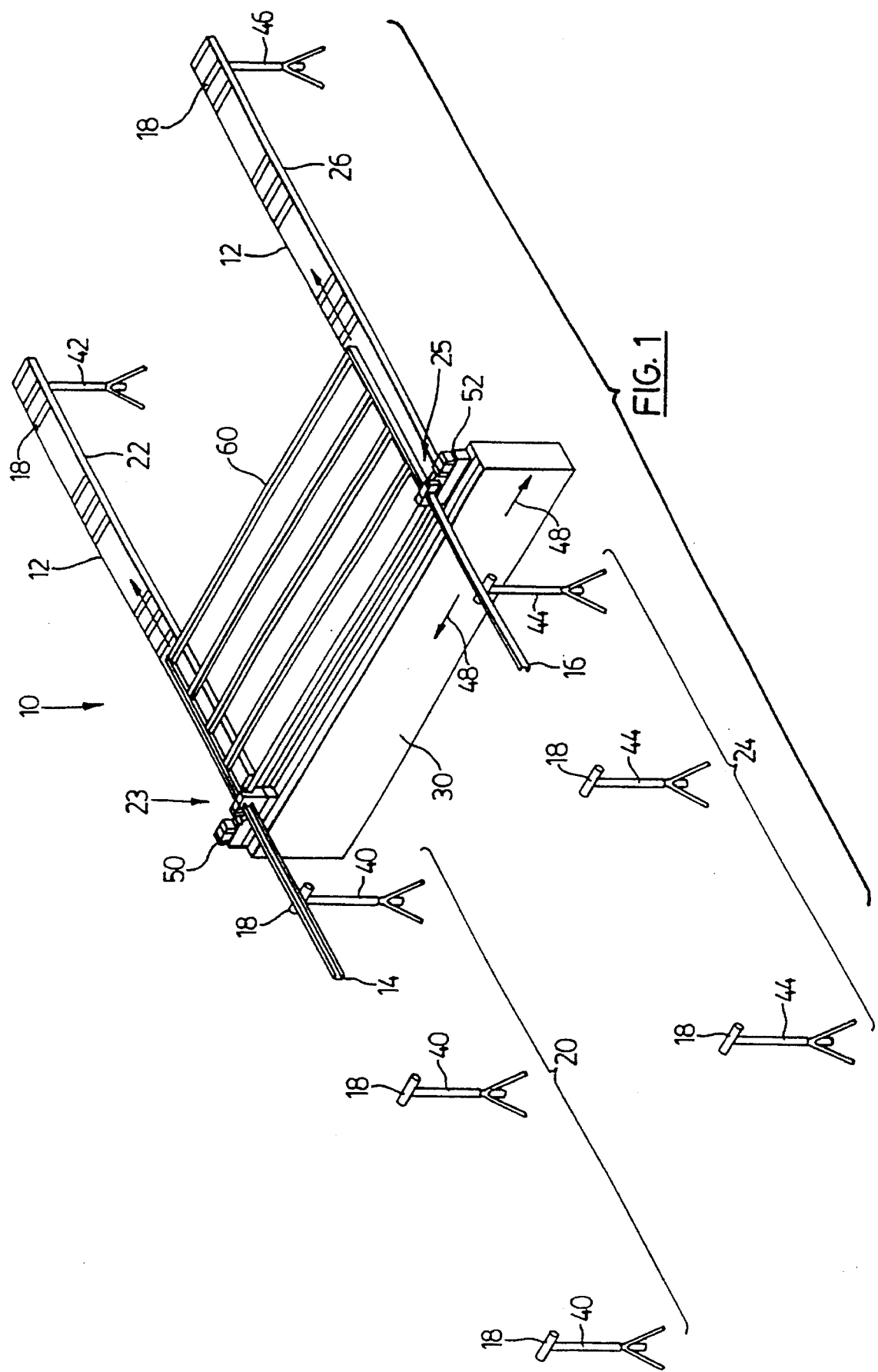

FIG. 1 illustrates the table of a preferred embodiment in accordance with the invention. The table shown generally as 10 includes a support surface 12. The support surface 12 is adapted to support an upper track 14 and a lower track 16. The upper and lower tracks 14 and 16 are the horizontal components of the finished wall. Each of the upper and lower tracks are manufactured from suitable gauge sheet steel and have an essentially U-shaped configuration with square corners. The track is sized to closely receive studs of the desired configuration.

The surface 12 of the table 10 is defined in the preferred embodiment by a series of rollers 18. The rollers 18 are journalled in bearings and permit the upper and lower tracks 14 and 16 respectively to roll freely back and forth along the table 10.

The table 10 is sufficiently wide to manufacture the wall of desired height. Where a table is to be used exclusively to manufacture walls of nominal eight foot height then the support surface is desirably slightly larger than eight feet. If higher ceiling walls are desired such as is typical in industrial and commercial walls a wider table would be provided.

The table shown in FIG. 1 is a particularly advantageous embodiment of the invention and is a knock-down table that can be readily disassembled, moved to a construction site and assembled on site. In other cases of course, construction tables may be used in plant facilities and the finished walls then trucked to the building site as desired.

With reference to FIG. 1 it will be observed that the table 10 comprises four sub-components each of which is a roller conveyor section. Sections 20 and 22 forming array 23 support the top channel 14 while sections 24 and 26 forming array 25 support the lower channel 16 of the wall to be manufactured. Sections 20 and 24 are comprised of individual rollers 18 supported on legs 40 and 44 respectively. The legs are arranged in line to form a part of surface 12 of the table.

A structural beam 30 extends between the two roller arrays 23 and 25. The roller sections 22 and 26 may be supported on folding legs 42 and 46 respectively. The other end of the sections is supported on the central beam member 30. The conveyor section 26 may be horizontally slidable on the beam member 30 to facilitate the manufacture of walls of different heights. Thus, where a wall of nominal height 8 feet was required the section 22 could be mounted to the beam 30 and the section 26 arranged with the spacing of 8 feet between the array 23 and the array 25. Where a wall of greater ceiling height is desired the section 26 can be slid outwardly on the beam 30 and the section 24 realigned to accomplish the manufacture of a wall that might be 9½ feet tall, 10 feet tall, 12 feet tall or as desired (see arrows 48). For the greatest flexibility the beam must be longer than the greatest wall height desired to be built on the table.

With the construction as shown in FIG. 1 the beam 30 becomes a central point for location of the other major components of the table.

Assembly stations 50 and 52 may be conveniently located along the beam where the beam meets the support sections 22 and 26. One assembly station 50 is used to affix a stud 60 to the top track while the other assembly station 52 is used to affix a stud 60 to the lower track 16.

Figure 4:
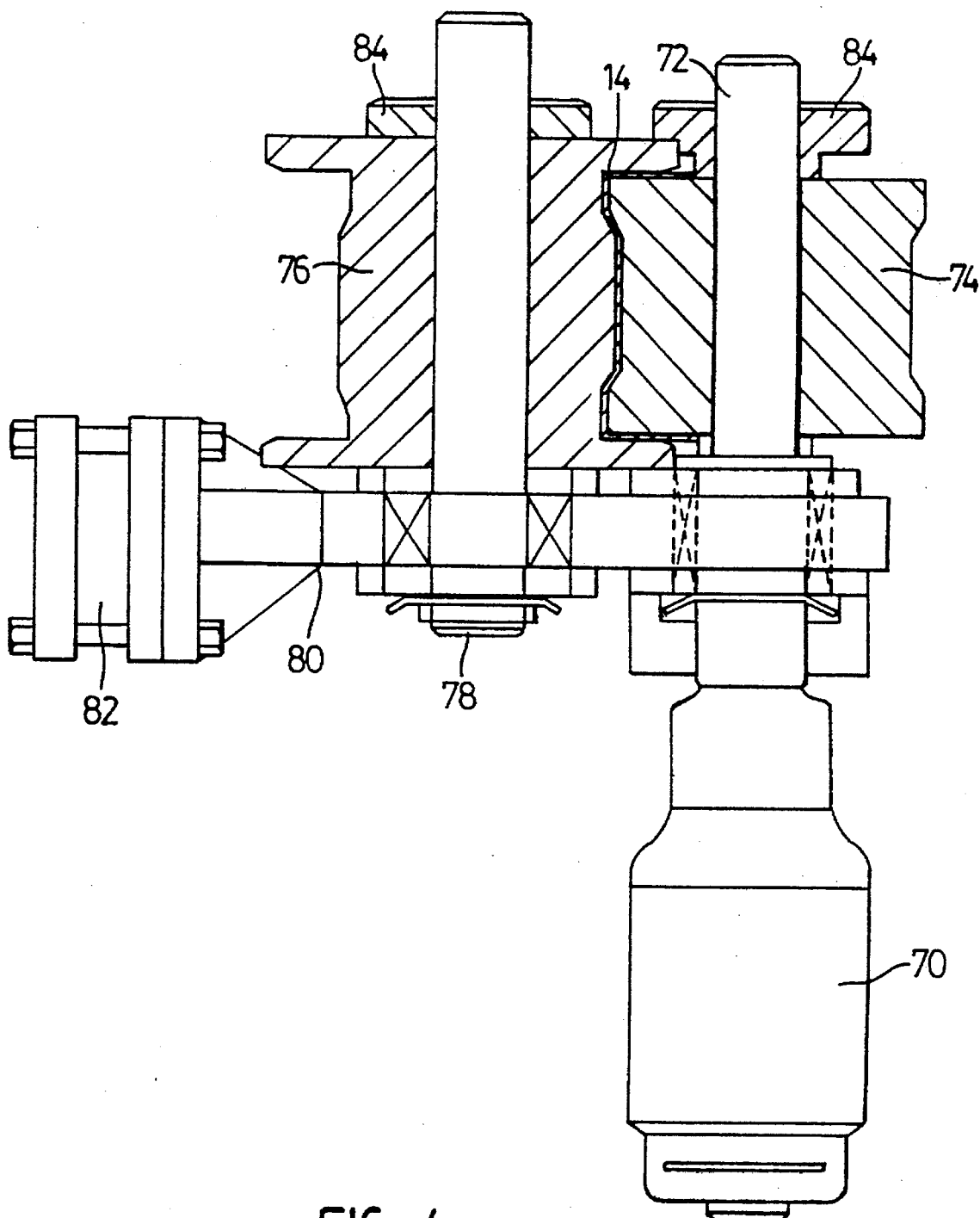
FIG. 4 is a sectional detail of the structure in FIG. 2 illustrating the mechanism for grasping the frame member illustrated in FIG. 2.

The table in accordance with the invention also includes means to move the upper and lower tracks back and forth along the roller support surface. A convenient means of driving the tracks back and forth is shown in FIGS. 2, 3 and 4. As shown in FIGS. 2 and 4 the drive means includes a servo motor 70 which extends vertically. The drive shaft 72 of the drive motor 70 extends upwardly above the support surface. A roller 74 is keyed on the drive shaft and revolves with the drive shaft under the effect of the motor 70. A second roller 76 is located horizontally opposite the first powered roller 74. The second roller 76 is located on an axle 78. The axle 78 is located in a bracket 80. The bracket 80 is in turn supported by a cylinder 82 which may be air powered.

As shown more clearly in FIG. 4, the two rollers 74 and 76 have co-operating surfaces which together grasp the profile of the track or channel 14. When a channel 14 is placed in position, the cylinder 82 is operated to bring the roller 76 into contact with one surface of the channel 14 and to force the channel against the powered roller 74. The roller 76 is an idler roller and is free to turn on its shaft (axle) 78. Thus, when the motor 70 revolves it will turn the drive shaft 72 and through a key will revolve the powered roller 74. Because the idler roller 76 is forced against the channel 14 there is significant friction between the rollers and the channel so that the powered roller accurately moves the channel back and forth along the support surface 12.

The rollers 74 and 76 are split rollers which may be readily removed from the powered and idler shafts 72 and 78 respectively. Where the channel 14 is of a nominal four inch width to take studs which may be nominally 4" wide then rollers adapted for channel of that size and configuration may be used. If for any reason it is desired to make use of studs that may be wider such as 6 or 8 inches, then rollers having a profile to match appropriate size channel can be installed on the shafts. In each case the shaft includes a threaded end and a lock nut 84 so that rollers may be readily removed and replaced if required to accommodate different size channel.

A similar drive mechanism is used on each side of the table so that the upper and lower channel 14 and 16 are both driven so the upper and lower channels 14 and 16 may be moved back and forth along the conveyor arrays 23 and 25. Ideally the two motors are connected together in a slave relationship so that the upper and lower channels 14 and 16 are moved at precisely the same time and precisely the same distance.

Figure 5:
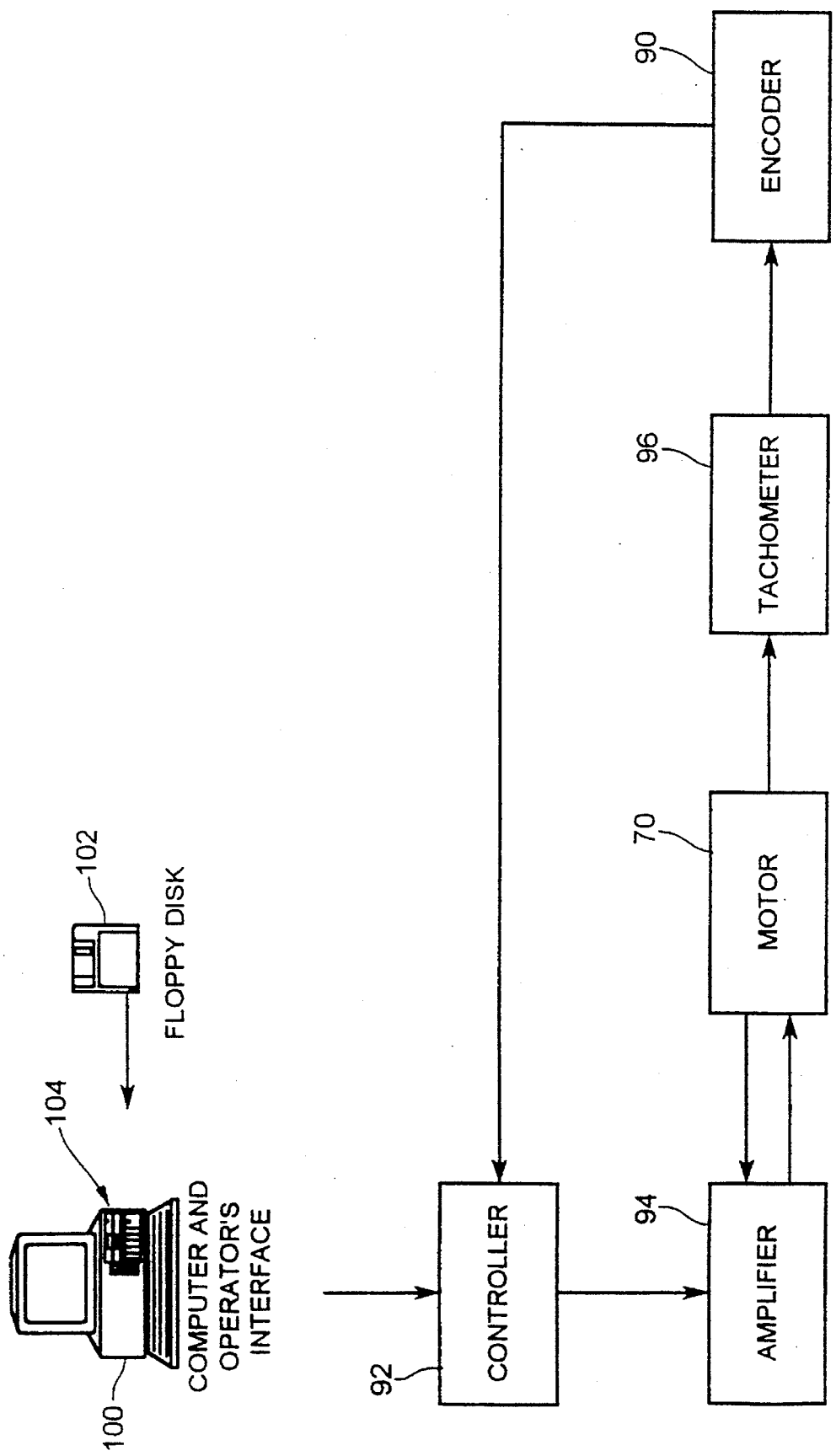
FIG. 5 is a block diagram showing the computer control of the device of FIG. 1.
Figure 8:
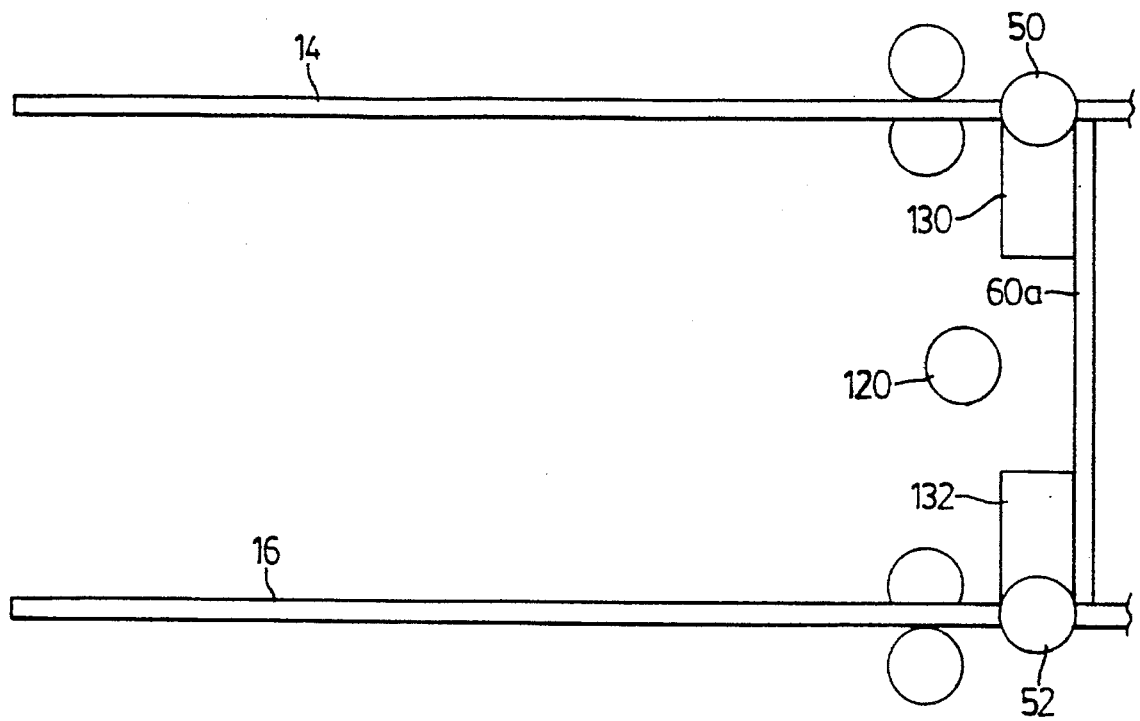
FIG. 8 is a view similar to FIG. 7 but showing another step in the process.

The control circuit for the motor 70 is shown in schematic diagram in FIG. 5. The control system is an open loop concept in which an encoder 90 is located in back of motor 70. The encoder sends signals back to a controller 92 providing motor position information. A separate encoder (not shown) applied to the upper or lower channel 14 and 16 could be used to feedback information to ensure that exact channel position has been obtained. However, because there is virtually no slippage between the rollers and the channel with the structure shown in FIGS. 2, 3 and 4, it is found that this has not been required in practise.

A principal feature of the invention is the controller 92. The controller 92 develops a signal which is passed to an amplifier 94. The output of the amplifier is used to drive the servo motor 70.

A tachometer 96 attached to the motor sends back a velocity signal to the amplifier 94. An encoder 90 behind the tachometer sends both velocity and position information to the controller 92. The controller 92 receives its input from a computer and interface 100. One of the principal features of the invention is that the computer 100 which directs the controller 92 is loaded with information as to the wall to be built. The computer 100 thus contains in computer readable format, information concerning the location of all of the required studs 60 for the wall to be built. Preferably the information is contained on a disk 102 or other type of media easily readable by a computer. Most preferably the computer may have a port 104 so that information from a computer assisted design (CAD) device could be downloaded directly into the computer. This eliminates the need for drawings for use in manufacturing the wall.

In order to manufacture a wall with this system it is important that the upper and lower channels 14 and 16 be accurately positioned to start the manufacturing process. In order to aid in the assistance of the initial phase of the manufacturing the table 10 is fitted with a pair of disappearing dogs 110 and 112, shown in FIGS. 3 and 6. In order to commence the manufacturing operation, an operator selects an appropriate upper 14 and lower 16 channel. The upper and lower channels 14 and 16 are placed on support surface portions 20 and 24 in substantially parallel alignment and rolled toward the assembly stations 50 and 52. The disappearing dog is located on the other side of the assembly stations 50 and 52 so that the upper and lower channels 14 and 16 respectively pass by the assembly stations 50 and 52 and encounter the disappearing dogs 110 and 112. When the upper channel 14 and lower channel 16 respectively encounter the disappearing dogs 110 and 112 and are located against the dogs, then the operator selects a first button which may be on the computer 100 or on the control panel 92 to indicate that the upper and lower channels 14 and 16 are in position against the dogs 110 and 112. On receiving the signal from the operator, the controller 92 then causes the cylinders 82 to cause the idler rollers 76 to move inwardly toward the channels so that the upper and lower channels are grasped firmly against the power rollers 74. If desired the power rollers 74 could then cycle to ensure that each channel 14 and 16 is located firmly against the dogs 110 and 112. This creates a "home" position from, which the controller 92 may thereafter control the position of the channel 14 and 16. With the channel 14 and 16 firmly grasped between power roller 74 and idler roller 76 the dog 110 and 112 is then retracted below the surface 12 of the table so that the channel 14 and 16 may then be moved along the table as required by the controller 92.

Figure 9:
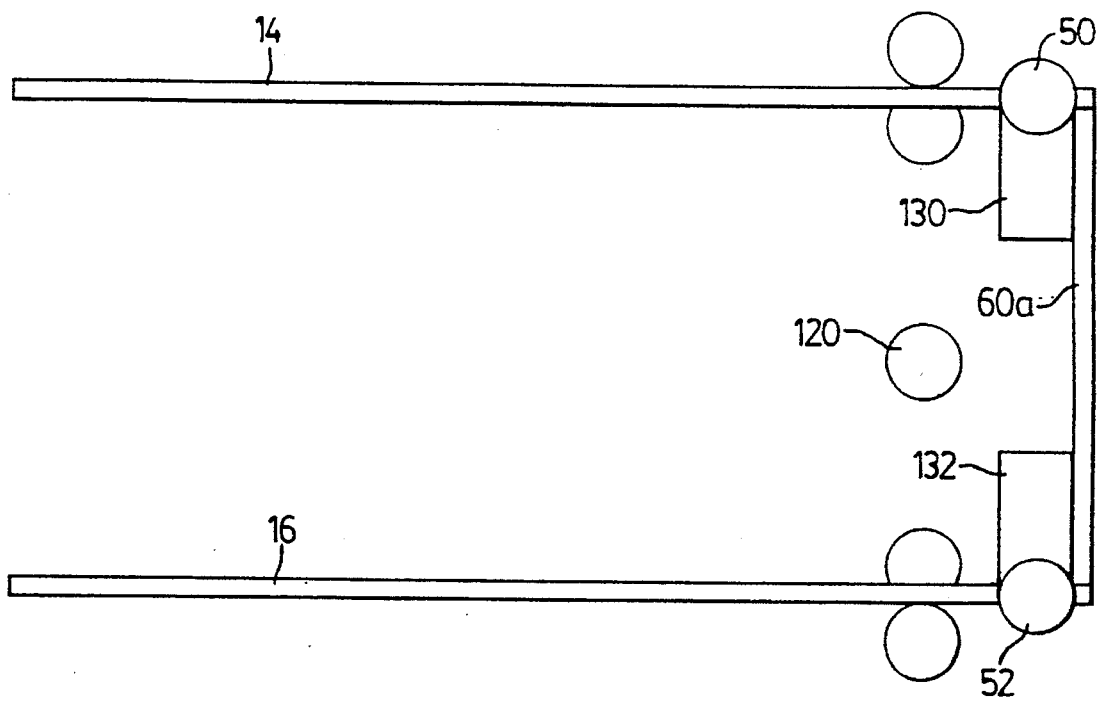
FIG. 9 is a view similar to FIG. 8 but showing another step in the process.
Figure 10:
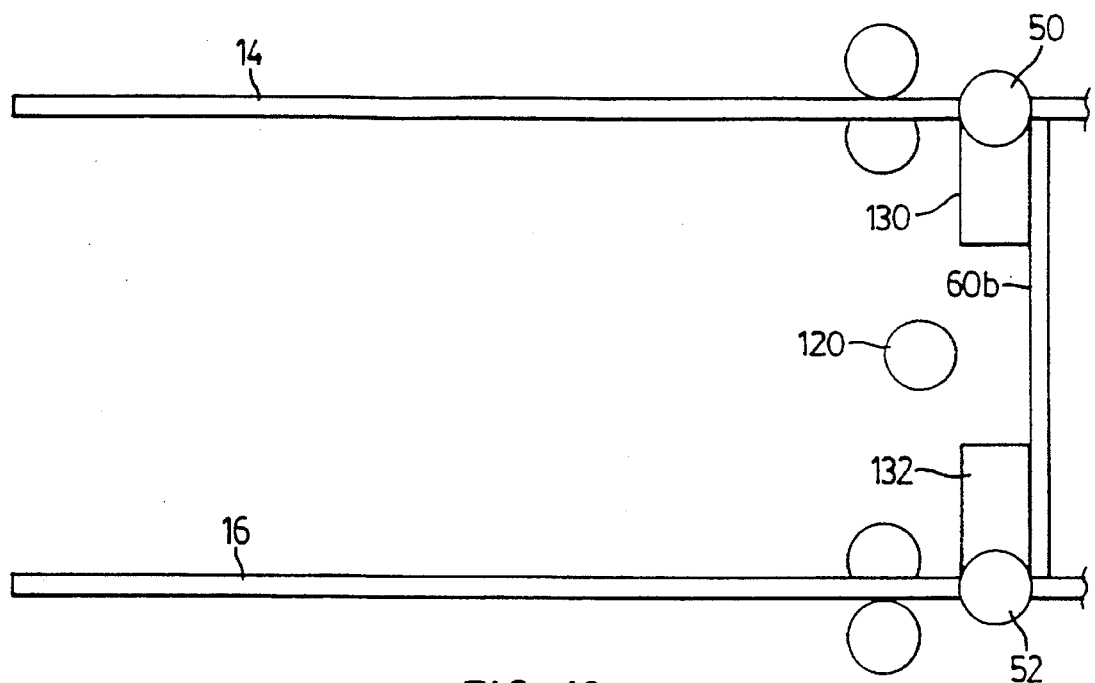
FIG. 10 is a view similar to FIG. 9 but showing another step in the process.

Located adjacent the assembly stations 50, 52 are installation jigs adapted to receive the stud 60. The initial configuration for the start of manufacturing is shown in FIG. 6. The operator who is to build the wall stands approximately as shown in FIGS. 6 through 13 at position 120. FIG. 6 shows the upper 14 and lower 16 channels in place in the "home" position as established by the disappearing dogs 110, 112. When the operator pushes the first button on the control panel 92, the upper and lower tracks are moved to the right as shown in FIG. 7. The channels 14, 16 roll freely along the conveyor arrays 23 and 25. The operator then selects a stud 60a and manually positions the stud between the upper 14 and lower 16 channel. Because the upper and lower channels 14, 16 are U-shaped the operator is required to position the stud 60 angularly between the tracks 14, 16 and then pull the stud 60 into position. When the stud 60 is in position between the upper and lower channels 14, 16 the operator pulls the stud 60 back towards the operator so that the stud is then received and positioned against receptor blocks 130 and 132. The open edge of the stud 60 faces the operator 120. Once a stud 60 is positioned against the receptor blocks 130, 132 which may include magnets to assist in holding the stud in place, the operator activates a second switch. This switch signals the controller that a stud is in place at the assembly stations 50, 52. On activation of the second switch, the controller 92 then directs the servo motors 70 to position the upper and lower channels 14, 16 appropriately. As shown in FIG. 9, the controller 92 will move the upper and lower channels 14, 16 to the left as shown in FIG. 9 so that the end of each channel 14, 16 is located precisely opposite the stud 60a. The end of each channel 14, 16 and the stud 60a are then positioned immediately adjacent the assembly stations 50 and 52. The assembly stations 50, 52 automatically perform the assembly operation affixing the stud 60a to the upper and lower channels 14, 16. Upon completion of the assembly operation the controller 92 moves the upper and lower channels 14, 16 forward (toward the right) on the support table to the position as shown in FIG. 10. It will be observed by reference to FIG. 10 that the first stud 60a which has been assembled to the upper and lower channels 14, 16 has been moved away from the assembly stations 50, 52 more than the typical spacing of the studs along the wall. At this time the operator is ready to install a second stud 60b.

Figure 11:
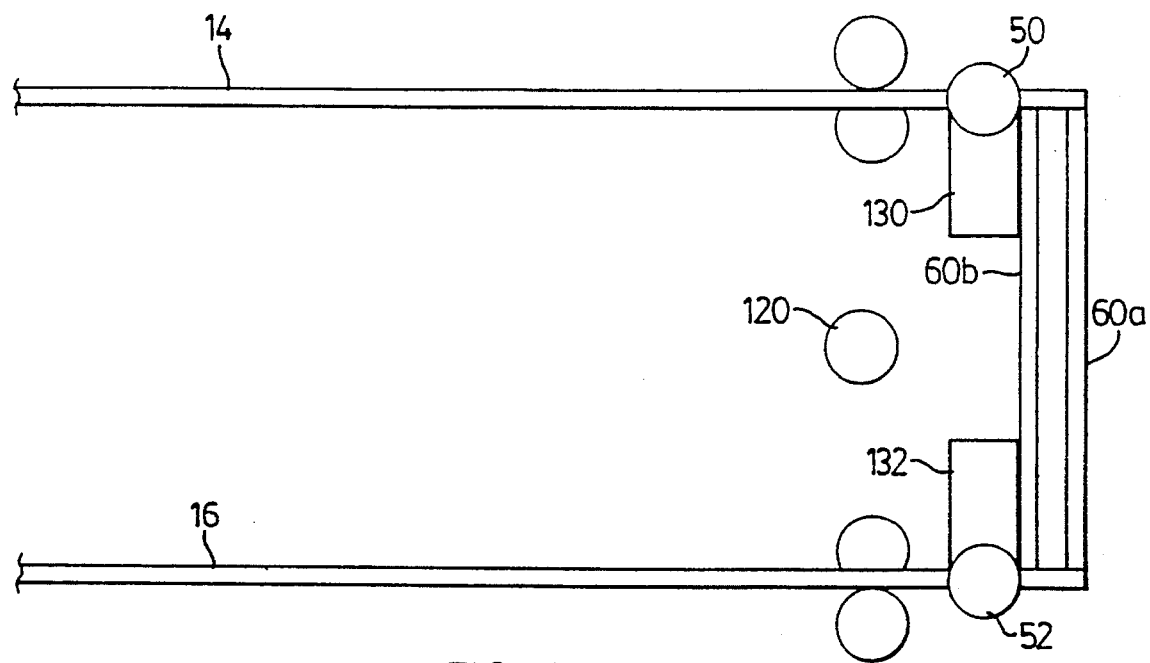
FIG. 11 is a view similar to FIG. 10 but showing another step in the process.
Figure 12:
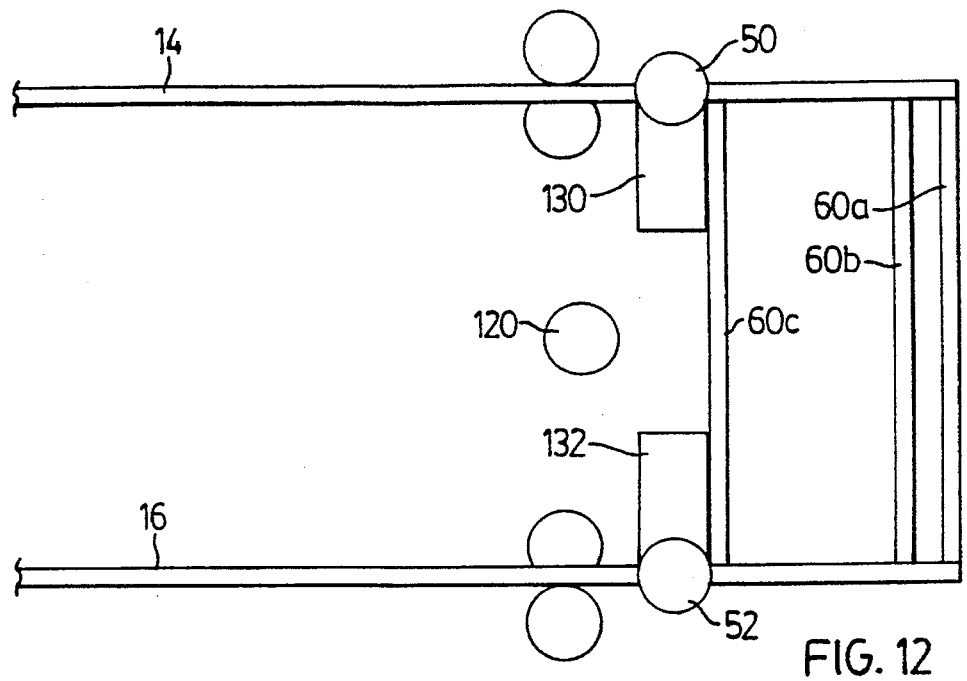
FIG. 12 is a view similar to FIG. 11 but showing another step in the process.
Figure 13:
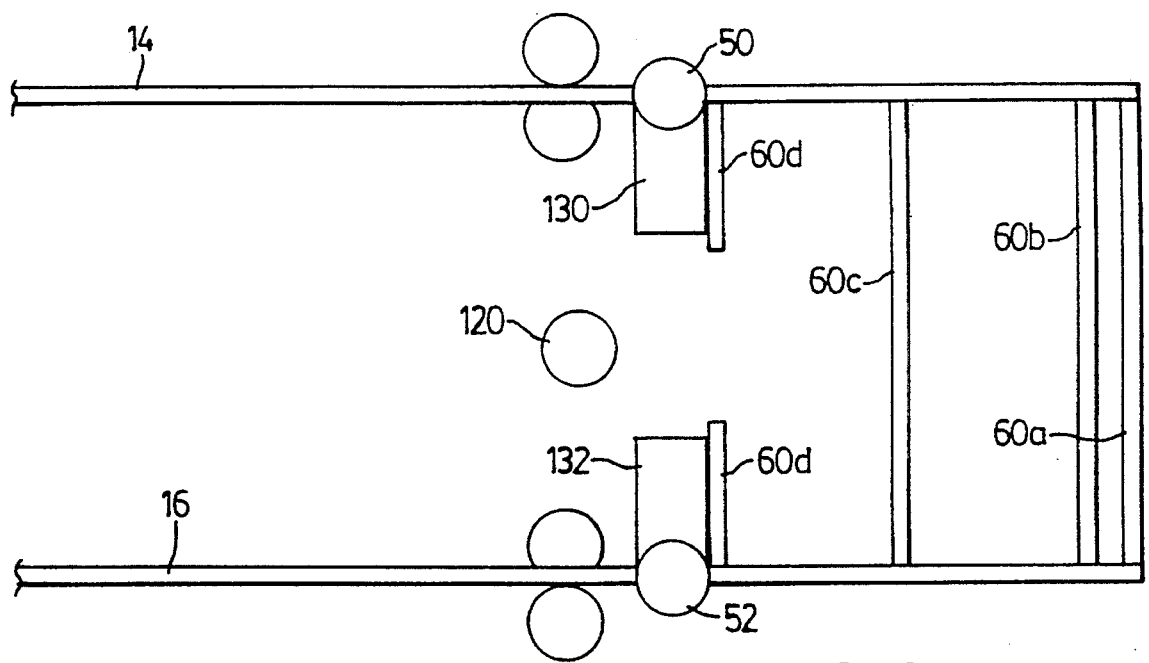
FIG. 13 is a view similar to FIG. 12 and showing another step in the process.

The operator 12 selects a second stud 60b and again positions the stud 60 between the upper and lower channels 14, 16 and against the receptor blocks 130, 132. When the operator has securely positioned the second stud 60b against the receptor block 130, 132, he again activates the second button. At this time the computer 100 reads its program to decide where the second stud 60b should be placed along the upper and lower channels 14, 16. The controller 92 receives this information and controls the servo motors 70 so that the channels 14, 16 are moved back to the left as shown in FIG. 11. When the channels 14, 16 are in the correct position the assembly devices 50, 52 automatically cycle and a second stud 60b is affixed in position. As shown in FIGS. 11 and 12 and as is typical in most walls the first two studs 60a and 60b are spaced relatively close together to assist in forming a corner.

At this time the operator selects a third stud 60c and repeats the process. In order to assist the operator in providing sufficient room to install the studs 60 in each case, the device preferably advances the wall more than the spacing required between the stud most recently installed and the stud to be installed, thus providing the operator additional room and freedom to quickly assemble the stud 60 between the upper and lower channels 14, 16. When the operator again operates the second button, the channels 14, 16 retract to the appropriate position, the assembly stations 50, 52 are cycled once again and the channels 14, 16 then advance for the installation of the next stud.

Where it is desirable to install cripple studs and the like, these may also be installed on the table 10. In these cases two short cripple studs 60d are located within the upper and lower channels 14, 16 respectively with each cripple stud 60d being placed against the receptor blocks 130, 132 appropriately. The operator then cycles the device once again, and the channels 14, 16 are properly located relative to the cripple studs 60d which are then affixed to the channels 14, 16.

The assembly of the wall then continues for whatever length of wall is required. The final or end stud may be attached to the channels 14 and 16 manually at the end of the channels. This may be done while the wall is on the support surface or later, as desired.

The assembly stations 50 and 52 are essentially similar. The particular fixation system between the channel 14, 16 and the stud 60 is a matter of choice for the designer. If the studs and channels are to be joined by screws then the assembly station will include upper and lower driven screw guns. Typically automatic screw feeds can be used to provide screws. The screws can be driven from above and below so that screws are driven through the flanges of stud 60 into the flanges of the channels 14, 16 respectively.

Figure 14:
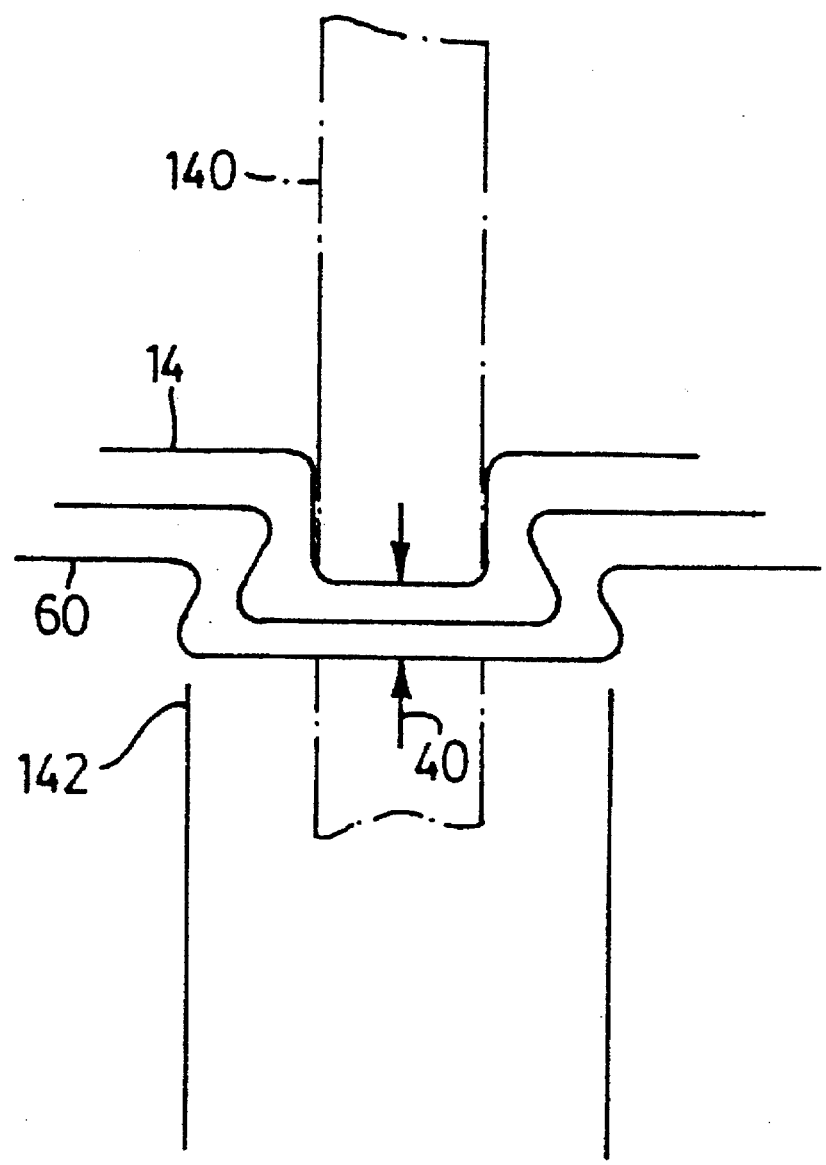
FIG. 14 is a cross-sectional view of a particularly desirable method of joining two pieces of sheet steel material together.

An alternative is to use a button type of configuration. Button joints have been used in the automotive industry in place of spot welds. In the button joint (see FIG. 14) there is required a hydraulic ram 140 which is pushed into one surface of the materials 14, 60 to be joined. The other surface of the materials 14, 60 to be joined is supported in an anvil 142. As the ram 140 pushes towards the anvil 142, a deformation of the two layers of metal is achieved forming a very strong button joint. This is more fully explained in U.S. Pat. Nos. 4,459,735 issued in 1984 and U.S. Pat. No. 4,757,609 issued in 1988, the disclosures of which are herein incorporated by reference.

As an alternative, spot welders could also be used.

The precise number of screws, buttons or spot welds or the like for each connection is simply a matter of choice to the designer depending upon the requirements of the wall.

The combination of the receptor blocks 130, 132 and the rollers 74 and 76 can be used to overcome another of the deficiencies of the prior art. Because the idler roller 76 is moved by a hydraulic cylinder 82, it may be forced against the track 14 and against the drive roller 74 with considerable pressure. The pressure between the rolls may thus be used to perform an accurate and final resizing and reconfiguration of the channel 14 (see FIG. 4). Thus where the channel has been manufactured in a roll forming operation perhaps remote from the construction site, it is possible that the flanges of the channel may have been deformed somewhat during the shipping and loading and unloading processes. The idler and powered rolls 76 and 74 can thus serve as a final sizing step for the channel. The receptor blocks 130, 132 accurately locate and hold the studs 60 while the connection is being made. As the distance between the powered roll 74 can be set accurately to maintain the overall height of the wall, it is ensured that the studs 60 are fully seated in the top and bottom channels 14, 16 respectively. If a stud 60 is not properly seated in the channel then the operator will not be able to seat the stud 60 against the receptor blocks 130, 132. Because the channel is accurately held by the powered rollers 74, the stud 60 would then be angled slightly rather than perpendicular to each of the channels 14, 16 and this would be detected at the receptor blocks 130, 132. Thus, the receptor blocks 130, 132 ensure that the stud is located in the right position prior to the assembly operation.

While upper and lower channels 14, 16 are typically of a U-shaped configuration, studs may be of different configurations depending upon their purpose. If steel studs are to be used as a dividing wall not carrying any structural loads, the studs may also be of a straight U-shaped configuration. Typically when steel studs are to be used as a structural wall carrying vertical loads, then the studs are so-called C-shaped sections. These are essentially U-shaped studs with a short return on each flange to provide increased strength. Studs are cut to appropriate length and are joined with fasteners through the flanges. The table and method as described herein however are not limited to fixing the studs through the flanges. A unique stud is illustrated in FIGS. 15 and 16.

Figure 15:
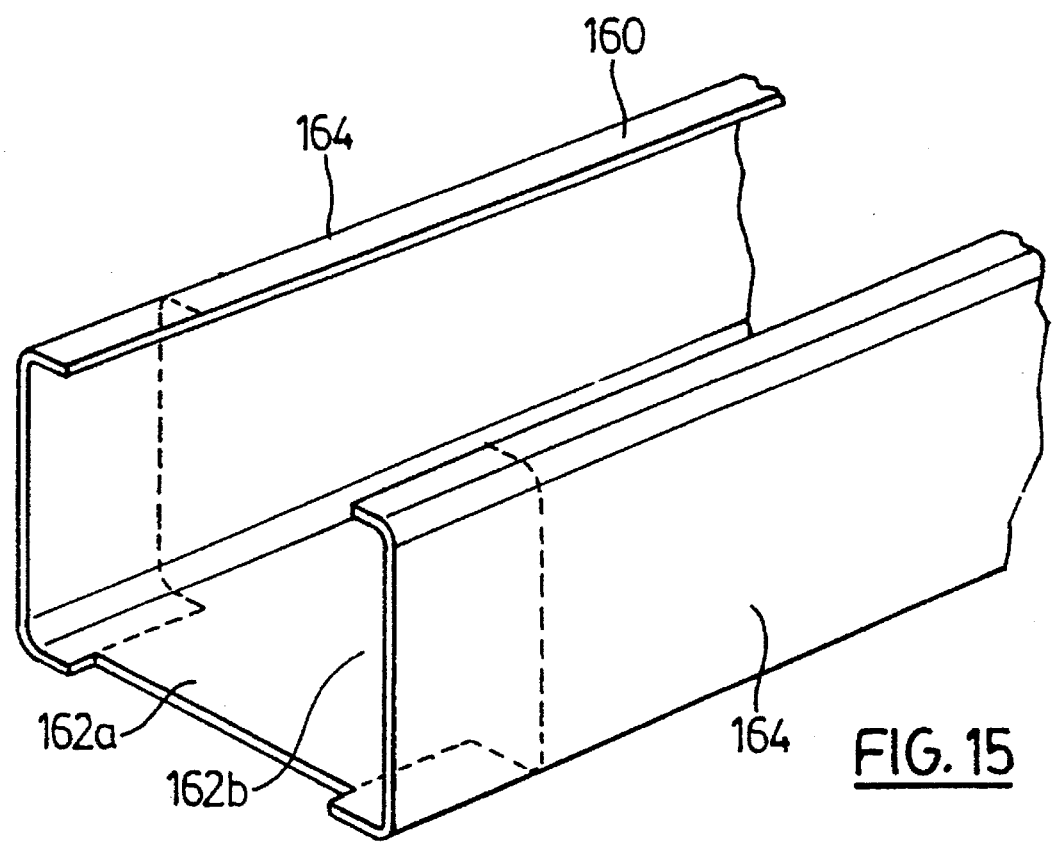
FIG. 15 is an isometric view of a stud which may be used in constructing building structures prior to modification.
Figure 16:
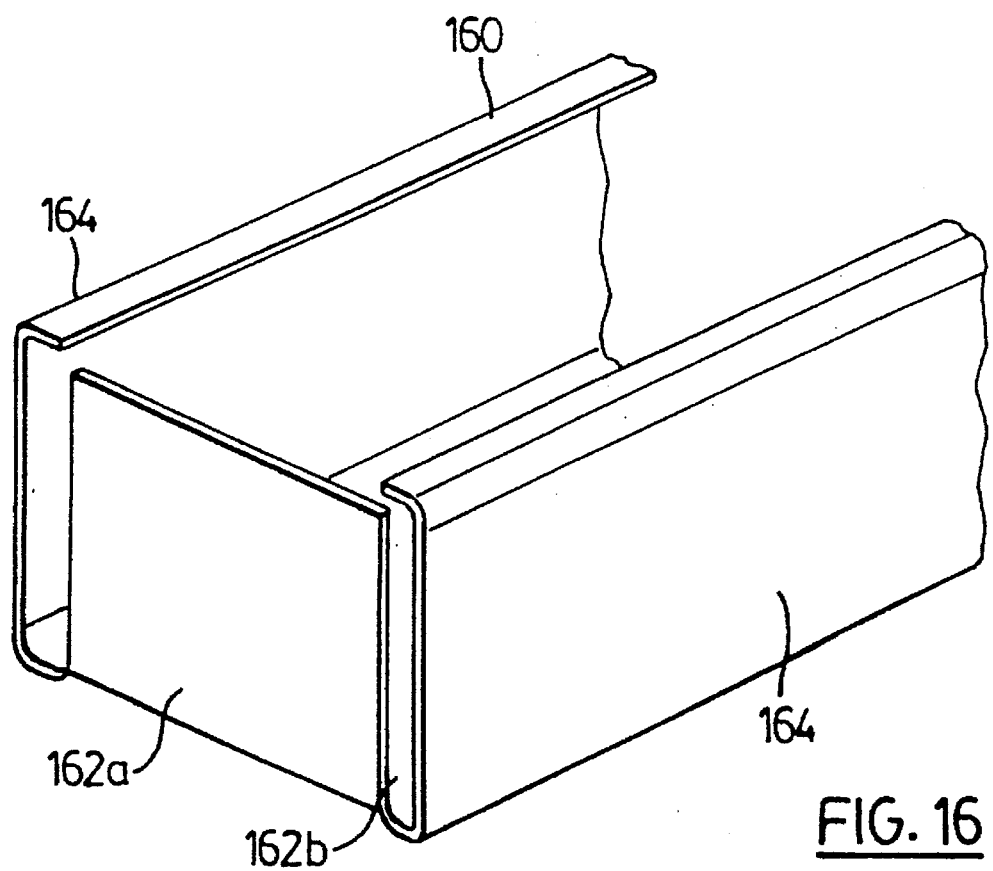
FIG. 16 is a view of the stud of FIG. 15 which has been modified.

The stud 60 shown in FIGS. 15 and 16 is of the typical C-shaped configuration. However, the stud 160 has been modified at the end so that the web surface 162*a* is bent at a 90° angle and extends at 90° to both the web 162*b* and the flanges 164. In order to make the stud 160 shown in FIG. 16, the stud is cut along the dotted lines shown in FIG. 15. A portion of each flange is removed leaving a tongue shaped web surface 162*a*. The tongue shaped web surface 162*a* is bent 90°. This provides a web surface 162*a* which would then parallel and lie adjacent to the web of the upper or lower channel 14, 16 as the case may be. With a stud of this configuration then the assembly station 50, 52 may be tipped 90°. Using the table of FIG. 1, the assembly station could then pass the fasteners through the flange of the channel and the bent web surface 162*a* of the stud 160. Again the method of fixation could be screws, spot welds or button joints as described above, or indeed any other kind of fixation that may be used to join two metal sheets together.

The gauge of the materials that may be used for either channels or studs is also something that can be chosen by the designer. Typically the gauge of the stud will be determined by the load to be carried by the stud. Any type of stud may be utilized in the machine and process as described herein. The only change that is required is that the receptor blocks 130, 132 must be sized and configured to accept the stud being used. As indicated above, the drive and idler rollers 74, 76 must also be sized to meet the configuration and gauge of the channels 14, 16. Finally, the assembly stations 50, 52 must also be equipped with appropriate devices to match the gauge of the materials being joined. Where the preferred button joint system is used this simply means appropriate choice of anvil and punch for the gauge of metals to be joined.

I claim:

1. A device to assist in manufacturing a building structure having first and second metallic channel-shaped framing members and a plurality of metallic studs extending between said framing members, said device comprising: a support table having a support surface, conveyor means located on said support surface, said conveyor means adapted to support said first and second framing members and to permit said framing members to move back and forth along said support surface, grasping means to grip said building structure, drive means for driving said grasping means to move said building structure back and forth along said support surface, controller means adapted to receive information for determining the location of studs in said building structure and for controlling said drive means and for translating said building structure predetermined distances along said support surface, stud locating means for locating a stud between said framing members, first and second assembly means located adjacent said stud locating means for permanently fastening said stud to said first and second framing members in a permanent configuration.

2. The device of claim 1 wherein said support surface comprises a plurality of rollers.

3. The device of claim 2 wherein said support table includes a first array of rollers to support said first framing member and a second array of rollers to support said second framing member.

4. The device of claim 1 wherein said grasping means is in a fixed position relative to said support table and includes a shaft and a first roller mounted on said shaft.

5. The device of claim 4 wherein said grasping means includes a second roller, said first and second rollers being adjacent to each other and configured to grasp therebetween a first one of said framing members.

6. The device of claim 5 wherein said grasping means includes a second set of said first and second rollers for grasping a second one of said framing members.

7. The device of claim 6 including means to move said second rollers toward said first rollers to grasp said first and second framing members and the drive means includes a motor for rotating said first rollers.

8. The device of claim 1 wherein the stud locating means include first and second receptor blocks, said receptor blocks adapted to receive said studs and locate said studs.

9. The device of claim 1 wherein said support table comprises a support beam extending between first and second arrays of rollers and at least one of said first and second arrays is movable along said support beam so that the spacing between said arrays may be selectively changed to facilitate building structures of different height.

10. The device of claim 9 wherein each said array includes first and second conveyor sections, each said conveyor section supported by said support beam and by a support leg.

11. The device of claim 10 wherein each said support leg is foldable with respect to said conveyor section.

12. The device of claim 7 wherein said motor is a servo motor.

13. The device of claim 1 further including a computer linked to said controller mean, said computer adapted to supply information to said controller means to indicate the location of a plurality of said studs with respect to said first and second framing members.

14. The device of claim 13 comprising a control circuit, said control circuit including said controller means and said computer, said control circuit further includes an amplifier for receiving signals from said controller means, said amplifier supplying amplified signals to said drive means, said circuit further comprising encoder means to feed back to said controller means signals indicative of the location of said framing members.

15. The device of claim 13 wherein said first and second assembly stations includes means to connect said studs to said framing members by installing fasteners in a flange of said stud and the in a flange of said framing members.

16. The device of claim 13 wherein said assembly stations connect said studs to said framing members by installing fasteners through the a web of said framing members and the a web of said stud.

17. The device of claim 1 wherein said support surface includes first and second dogs, said dogs being movable from a first position in which each dog limits movement of one of said framing members in a first direction along said support surface and a second position in which said dogs do not impede movement of said framing members to any position along said support surface.

18. The device of claim 15 wherein said fastener is a button formed by deforming adjacent surfaces of said stud and said framing members.

19. The device of claim 16 wherein said fastener is button formed by deforming adjacent surfaces of said stud and said framing members.

20. A method for manufacturing a building structure having first and second metallic channel-shaped framing members and a plurality of metallic studs extending between said framing members, said method comprising, locating a first framing member on a support surface, locating a second framing member on said support surface with said second framing member spaced from said first framing member and parallel thereto, grasping said building structure and locating said building structure in a first position, assembling a stud to extend between said first and second framing members and locating said stud adjacent first and second assembly means, moving said first and second framing members to desired positions, permanently connecting said stud to said framing members in a permanent configuration, advancing said building structure along said support surface, assembling a second stud to extend between said first and second framing members and locating said second stud adjacent said first and second assembly means, controlling the position of said building structure and locating said building structure with respect to said second stud in a predetermined location, permanently connecting said second stud to framing members in a permanent configuration.

21. The method of claim 20 including moving said building structure a motor and controlling said motor by a controller.

22. The method of claim 21 including feeding information to said controller of the location of a plurality of said studs in said building structure.

23. The method of claim 22 further including feeding information to said controller from a computer, and inputting to said computer said information concerning the location of a plurality of said studs.

24. The method of claim 20 further including the step of locating said first and second framing members in a home position prior to connecting the first of said plurality of studs to said first and second framing members.

25. The method of claim 23 further including the step of advancing said building structure in a first direction along said support surface after connecting a stud to said first and second framing members, a distance greater than the spacing between said stud and the next adjacent stud in said building structure.

26. The method of claim 25 wherein said next adjacent stud is positioned adjacent said first and second assembly means and said building structure is moved along said support surface in a direction opposite to said first direction to a desired position so that said next adjacent stud may be connected to said first and second framing members in a desired location.

27. The method of claim 23 wherein said information concerning the location of said plurality of studs is downloaded to said computer from a computer aided design device.

28. The method of claim 25 wherein said studs are located on said support surface with respect to said first and second framing members by positioning said studs against first and second receptor blocks.

29. The method of claim 20 wherein said studs are connected to said first and second framing members by means of fasteners connecting flanges of said studs with flanges of said framing members.

30. The method of claim 20 wherein said studs are connected to said first and second framing members by means of fasteners connecting a web of said studs to a web of said framing members.

31. The method of claim 29 in which said connection is made by deforming adjacent surfaces of said stud and the framing members to form a button.

32. The method of claim 30 in which said connection is made by deforming adjacent surfaces of said stud and framing members to form a button.

33. A device to assist in manufacturing a building structure having first and second metallic channel-shaped framing members and a plurality of metallic studs extending between said framing members, said device comprising: a support table having a support surface, conveyor means located on said support surface, said conveyor means adapted to support said first and second framing members and to permit said framing members to move back and forth along said support surface, grasping means to grip said building structure, drive mans for driving said grasping means to move said building structure back and forth along said support surface, controller means adapted to receive information for determining the location of studs in said building structure and for controlling said drive means and for translating said building structure predetermined distances along said support surface, stud locating means for locating a stud between said framing members, first and second assembly means located adjacent said stud locating means for permanently fastening said stud to said first and second framing members in a permanent configuration, a computer linked to said controller means and adapted to supply information to said controller means to indicate the location of a plurality of said studs with respect to said first and second framing members, and a control circuit which includes said controller means and said computer and further includes an amplifier for receiving signals from said controller means, said amplifier supplying amplified signals to said drive means, said circuit further comprising encoder means to feed back to said controller means signals indicative of the location of said framing members.

* * * * *